United States Patent [19]

Pazzaglia

[11] Patent Number: 4,744,460

[45] Date of Patent: May 17, 1988

[54] DEVICE FOR TRANSLATING PARTS UNDERGOING MACHINING ON ULTRAPRECISE HIGH SPEED MACHINES

[75] Inventor: Luigi Pazzaglia, Bologna, Italy

[73] Assignee: Cefin S.p.A., Bologna, Italy

[21] Appl. No.: 894,752

[22] Filed: Aug. 12, 1986

Related U.S. Application Data

[63] Continuation-in-part of Ser. No. 597,229, Apr. 4, 1984, abandoned.

[30] Foreign Application Priority Data

Apr. 12, 1983 [IT] Italy .................................. 3394 A/83
Feb. 24, 1984 [IT] Italy .................................. 3355 A/84

[51] Int. Cl.$^4$ ............................................ B65G 25/02
[52] U.S. Cl. ................................ 198/740; 198/468.1; 198/479.1; 414/750; 414/917
[58] Field of Search .............. 198/430, 468.9, 468.10, 198/468.11, 474.1, 479.1, 597, 598, 740; 414/18, 750, 752, 917, 733

[56] References Cited

U.S. PATENT DOCUMENTS

| | | | |
|---|---|---|---|
| 1,766,573 | 6/1930 | Westin | 414/733 |
| 2,097,747 | 11/1937 | Suzuki | 198/740 |
| 2,176,485 | 10/1939 | Bronander | 198/430 |
| 2,596,404 | 5/1952 | Holbeck | 198/430 |
| 2,964,163 | 12/1960 | Christiansen et al. | 198/430 |
| 3,333,674 | 8/1967 | Homan | 198/740 |
| 3,826,381 | 7/1974 | Kulig et al. | 414/752 |
| 3,923,142 | 12/1975 | Rysti | 198/461 |
| 4,039,073 | 8/1977 | Ohlhaver | 198/740 X |
| 4,339,028 | 7/1982 | Meacle | 198/468.11 X |
| 4,400,985 | 8/1983 | Bond | 414/752 X |
| 4,634,338 | 1/1987 | Tsuge et al. | 414/752 |

FOREIGN PATENT DOCUMENTS

| | | | |
|---|---|---|---|
| 844576 | 7/1952 | Fed. Rep. of Germany | 198/468.6 |
| 738878 | 10/1955 | United Kingdom . | |
| 881231 | 11/1961 | United Kingdom . | |
| 1267326 | 3/1972 | United Kingdom . | |
| 650903 | 3/1979 | U.S.S.R. | 198/597 |

OTHER PUBLICATIONS

Moore, R. L., "Western Electric Technical Digest No. 50," *Rectilinear Feed Drive for Advancing Electronic Device Packages*, Apr. 1978.

*Primary Examiner*—Joseph E. Valenza
*Assistant Examiner*—Jonathan D. Holmes
*Attorney, Agent, or Firm*—Balogh, Osann, Kramer, Dvorak, Genova & Traub

[57] ABSTRACT

A device having a pusher that extends in a direction crosswise to a displacement path of parts undergoing machining, and at least one articulated parallelogram that supports the pusher. The articulated parallelogram is envisaged extending in planes parallel to the path of the parts undergoing machining, and having a fixed side directed transversely to the path.

7 Claims, 1 Drawing Sheet

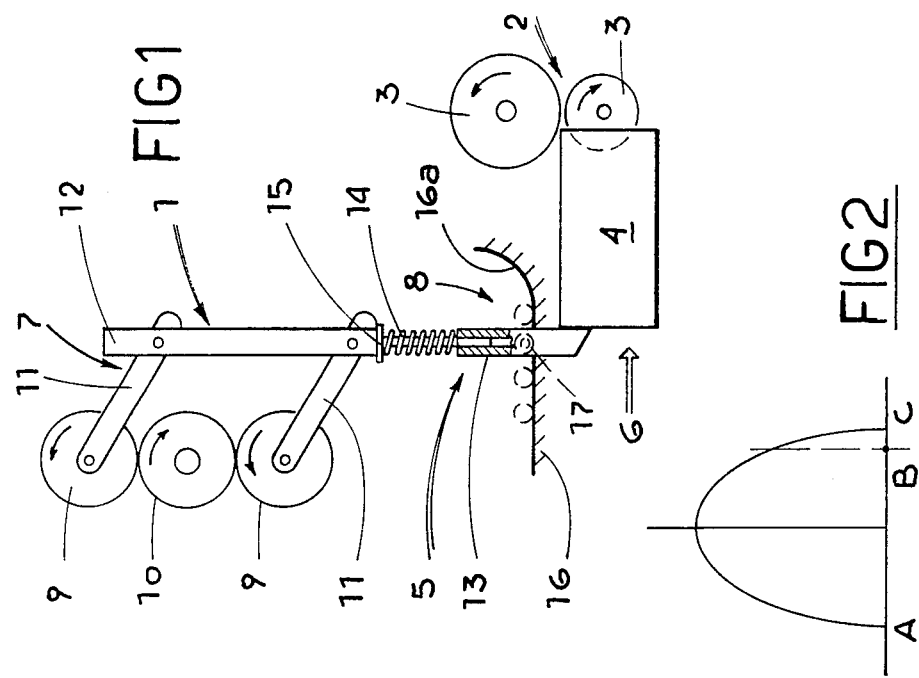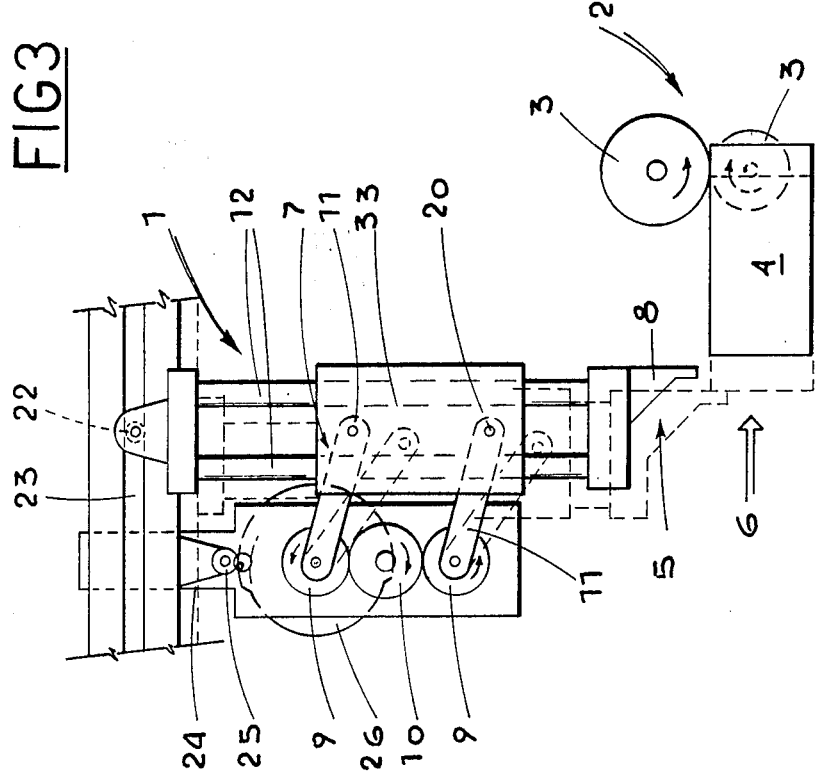

DEVICE FOR TRANSLATING PARTS UNDERGOING MACHINING ON ULTRAPRECISE HIGH SPEED MACHINES

This application is a continuation-in-part of application Ser. No. 597,229, filed Apr. 4, 1984, now abandoned.

BACKGROUND OF THE INVENTION

The invention relates to a device for translating parts undergoing machining on ultraprecise high speed machines.

On automatic machines where the parts to be machined have to occupy various positions in succession, it is known that use is frequently made of transportation teeth whose task is to withdraw each individual part from one position and remove it to another.

When it is necessary, during displacement, to guarantee the parts following a rectilinear path, with the positions thereof being maintained, two transportation teeth are normally required, and these have to follow identical laws of motion and maintain a rigorously fixed position with respect to one another.

Furthermore, suitable means are needed to get the teeth to come into contact with the part undergoing machining at the right moment, and after having carried the part to the required position, to return to the initial position so as to withdraw a fresh part.

Often there are also special requirements as regards the speeds at which the parts have to be withdrawn and/or released.

DESCRIPTION OF THE PRIOR ART

At the present time, the means employed for obtaining the above mentioned result are of various types, such as chains provided with teeth mounted on slides operated by suitable mechanisms, etcetera.

Almost all the known systems are, however, unable to give satisfactory results when utilized on machines that have to run at a very high speed and for which ultraprecise positioning is required.

The said means are, in particular, inadequate when, jointly with the said characteristics of high speed and ultraprecision, there are special requirements concerning the withdrawal and/or release speeds of the parts being machined.

One particular example of this situation is identifiable on machines for the resistance welding of metal containers, where the bodies of the containers have to be inserted in between the welding rollers. All the operations have to be extremely precise on these machines, and the grasping of the box shaped bodies has to be performed to suit the particular characteristics of the preceding means of conveyance and then lead to the insertion or placing of the said box shaped bodies in between the said rollers at a speed, in a horizontal direction, corresponding to the tangent velocity of the welding rollers.

In order not to cause an excessive rise in costs for the machines on which the said devices are installed, the fact should not be overlooked that they must possess characteristics of simplicity.

SUMMARY OF THE INVENTION

The technical task at the basis of the invention is, in view of the foregoing, to design a device for translating parts undergoing machining, in particular on ultraprecise high speed machines, able to satisfy the requirements outlined above.

Within the framework of the said technical task, one important object of the invention is to design a device that can easily be suited to machines of various types, and also to machines with a variety of requirements as regards the speed of grasping and/or delivering the parts being machined.

A further object of the invention is to design a device which, due to the specific structure thereof, is not only simple and inexpensive but is also quite small and easy to position on the machine concerned.

The technical task mentioned above and the stated objects are attained with the device according to the invention for translating parts undergoing machining on ultraprecise high speed machines, comprising pusher means that extend in a direction crosswise to the displacement path of the parts undergoing machining, and at least one articulated parallelogram that supports the said pusher means, and wherein the said articulated parallelogram extends in planes virtually parallel to the said path and has a fixed side directed transversely to the said path.

An advantageous feature of the said pusher means is that the active extremity thereof is tooth shaped and is movable in a direction parallel to the said fixed side under the action of control means provided for the said active extremities.

BRIEF DESCRIPTION OF THE DRAWINGS

Further characteristics and advantages will become more apparent from the description of one preferred, but not sole, embodiment for the invention, illustrated purely as an unlimited example on the accompanying drawings, in which:

FIG. 1 shows, in a lateral view and in a diagrammatic way, the device according to the invention;

FIG. 2 shows the law of variation in the working speed of the device, in the direction in which the parts undergoing machining move forward;

FIG. 3 shows, in a lateral diagrammatic view, an alternative to the solution illustrated in FIG. 1.

DESCRIPTION OF THE PREFERRED EMBODIMENT

With reference to the above listed figures, the device forming the subject of the invention is shown globally at 1 fitted to a welding machine 2 of the resistance type for metal containers, of which can be seen the welding rollers 3 in between which are inserted the said metal containers, shown at 4.

The device 1 essentially comprises pusher means 5 that extend in a direction crosswise to the displacement path of each part 4 being machined, shown with an arrow at 6, as well as at least one articulated parallelogram 7 that supports the pusher means 5. The latter end, in the region of each container or part 4, in an active extremity 8 subtantially in the form of a tooth.

The fixed side of the articulated parallelogram 7 extends perpendicularly to the path 6, and in the instance described herein is constituted by a number of gears among which can be distinguished a pair of extremity gears 9 and a central gear 10. The latter is, preferably, driven and the motion given thereto is, for example, uniform. The extremity gears 9 support, in the region of the axes thereof, cranks 11 that are identical and are parallel one to the other.

In the case of the embodiment shown in FIG. 1, the said cranks 11 are pivotally connected, in a way whereby able to rotate, to a rod 12 that is parallel to the said fixed side and expands in the direction of the movement path 6 of the parts 4 undergoing machining.

An advantageous feature is that the pusher means 5 are constituted by a pair of parallel rods 12 placed side by side at sufficient a distance for precise engagement with the parts or containers 4.

With the said solution it is envisaged that the active extremity 8 of the pusher means 5 be movable in a direction parallel to the fixed side of the articulated parallelogram 7, that is to say, to each rod 12. The said active extremities 8 are, in fact, constituted by sleeves 13 that slide on the rods 12 in contrast with elastic means 14, for example in the form of compression springs restrained by a collar 15 machined in the rods 12.

Furthermore, again with reference to FIG. 1, the vertical movement of the sleeves 13 is subjected to fixed cam control means constituted by a base cam 16 on which rests a cam follower tail piece 17 that projects laterally from each sleeve 13. The cam 16 is virtually parallel to the path 6 over the bulk of the extension thereof and then has a terminal section 16a bent in a vertical direction.

The operation of the device according to the invention is particularly obvious, also as regards FIG. 2.

Through the action of the articulated parallelogram 7, in which the cranks 11 effect a complete rotary movement, the rods 12 follow closed paths in vertical planes, keeping parallel to themselves. As a result of this, the active extremities travel over circumference sections during the raise-return-lower movement, until a point in the region of the cam 16 is reached. The vertical movement of the active extremities is halted by the cam 16 in such a way that the movement be absorbed by the spring 14. Thus the active extremities 8 effect perfectly linear displacements in the region of the work sections, when they engage with a container or part 4 undergoing machining.

Despite the active extremities 8 effecting perfectly linear displacements, the linear velocity thereof varies in accordance with the rods 12, as per the graph in FIG. 2 typical of articulated parallelograms.

It is, therefore, possible to cause the engagement with the parts undergoing machining of the active extremities 8 to take place at predetermined points of the said graph, particularly at points of this that coincide, on one hand, with the speed of the preceding means of conveyance and, on the other, with the tangent velocity of, for example, the rollers 3.

In the case, instead, illustrated in FIG. 3, the cranks 11 are pivotally connected at 20, in a way whereby able to rotate, to a sleeve 33 parallel to the said fixed side and provided longitudinally, that is to say parallel to the said fixed side, with slots (two in the case described herein) for the unimpeded passage of corresponding rods 12, the lower part of which carries the said teeth 8, while the upper part is coupled, via a roller 22, to a first horizontal guide 23. The said guide is integral with a second vertical guide 24 contained and movable vertically inside the fixed body of the device, this being coupled, through a cam follower tail piece 25, to a cam 26 intregral with the upper gear wheel 9, in a way whereby able to rotate with this.

The guide 23 is parallel to the path 6 that the box shaped body 4 has to follow, and the constraint between the cam follower tail piece 25 and the cam 26 is bilateral.

Also in this case, through the action of the complete rotatory movement of the cranks 11, the sleeve 33 follows closed paths in vertical planes, with the position thereof being maintained. As a result of this, and by virtue of the mechanism illustrated that connects the sleeve 33 - the rods 12 - the horizontal guide 23, the active extremities 8 undergo perfectly linear displacements in the region of the work sections, when they engage with a container or part 4 undergoing machining, since at this work stage the teeth 8 are lowered through the tail piece 25 coming into contact with the low part of the profile of the cam 26.

Vice versa, when the sleeve arrives in proximity of the top dead center (illustrated in FIG. 1) and the box shaped body 4 has already been imprisoned between the rollers 3, the upper part of the profile of the cam 26 comes into contact with the cam follower tail piece 25, and this causes the second vertical guide 24, the first horizontal guide 23 and with this, via the rods 12, the teeth 8 to be raised.

It is, therefore, also possible in this instance to cause the engagement (lowering) of the active extremities 8 with the parts undergoing machining to take place at predetermined points in the said graph, by suitably profiling the cam 26.

The present invention is utilized to exactly regulate the speed of the pusher member 8 to the speed in particular of the succeeding means. In other words, it is very important to withdraw one single box-shaped body with the speed of the preceding means and with the speed of the rollers 3 of the welding machines 2.

During this pushing-running, when the active extremity 8 is in contact with the box 4, it is of basic importance that the active extremity runs parallel directed in line with the feeding direction 6 of the box 4. It is necessary to avoid transversal movements between the active extremity 8 and the back side of the box 4.

In other words, through the action of the articulated parallelogram 7, the rods 12 follow closed paths in vertical planes, keeping parallel to each other.

The active extremities travel over circumferential sections during the raise-return-lower movement until a point in the region of the cam 16 is reached.

The vertical movement of the active extremities is halted by the cam 16 in such a way that the movement can be absorbed by the spring 14.

Thus, the active extremities 8 perfectly effect linear displacements in the region of the work sections, when they engage with the box.

Moreover, the push direction of the active extremity 8 is directed parallel to the feeding direction 6 in the operative running.

Thus the device forming the subject of the invention achieves the proposed objects. Emphasis is laid on the simplicity of the device and of the easy adaptability thereof to suit the most wide range of machines and work speeds.

The invention as described herein is liable to undergo numerous modifications and variants, all of which falling within the conceptual framework thereof.

Furthermore, all parts may be substituted with others of technical equivalence.

In practice, the materials used, as also the shapes and sizes thereof, may be any depending on the requirements.

What is claimed is:

1. Device for translating parts undergoing machining on ultraprecise high speed machines utilizing a motorized regulatable speed working station, such a device comprising pusher means extending in a transversal direction with respect to the feeding direction of the parts undergoing machining and disposed upstream of said working station, an articulated parallelogram supporting said pusher means wherein said articulated parallelogram has a fixed side directed transversely to said feeding direction, and wherein said pusher means follows a closed path intersecting the path of said parts undergoing machining along said feeding direction, and control means being provided to cause said pusher means to follow a linear path parallel to said feeding direction during the operative running of said pusher means in such a way as to regulate, in combination with the rotational speed of a rotating arm of said articulated parallelogram, the speed of said pusher means with respect to the speed of parts undergoing machining in said working station, wherein the rotational speed of said articulated parallelogram is regulated to the speed of said working station.

2. Device according to claim 1, wherein said pusher means has a tooth-shaped member, said control means comprising cam means disposed at a side of said member and causing said member to move along said linear path parallel to the feeding direction, and elastic means provided to operate on said member in order to bias said cam means.

3. Device according to claim 2, wherein the cam means engage with a sleeve projecting laterally from said member, said cam means acting in opposition to the bias provided by said elastic means.

4. Device according to claim 1, wherein said pusher means includes a rod that extends from said articulated parallelogram and is provided with a tooth-shaped member, said rod being parallel to said fixed side of said parallelogram.

5. Device according to claim 4, wherein said member is supported by a sleeve which enshrouds an end part of said rod.

6. Device according to claim 1, wherein said pusher means are defined by at least one rod movable relative to said articulated parallelogram and provided with a tooth-shaped member on one end thereof, said at least one rod being slidably movable parallel to said fixed side of said parallelogram.

7. Device according to claim 6, wherein said control means include a cam that is intregral with said articulated parallelogram and is able to rotate with said parallelogram while acting on a guide disposed parallel to said feeding direction and connected to said at least one rod at the end opposite to said one end provided with said member.

* * * * *